United States Patent
Furman et al.

(10) Patent No.: US 6,994,526 B2
(45) Date of Patent: Feb. 7, 2006

(54) TURBOCHARGER COMPRESSOR WHEEL HAVING A COUNTERBORE TREATED FOR ENHANCED ENDURANCE TO STRESS-INDUCED FATIGUE AND CONFIGURABLE TO PROVIDE A COMPACT AXIAL LENGTH

(75) Inventors: Anthony Holmes Furman, Scotia, NY (US); Kendall Roger Swenson, Erie, PA (US); Daniel Edward Loringer, Erie, PA (US)

(73) Assignee: General Electric Company, Niskayuna, NY (US)

( * ) Notice: Subject to any disclaimer, the term of this patent is extended or adjusted under 35 U.S.C. 154(b) by 98 days.

(21) Appl. No.: 10/650,839

(22) Filed: Aug. 28, 2003

(65) Prior Publication Data

US 2005/0056013 A1    Mar. 17, 2005

(51) Int. Cl.
*F04D 29/20* (2006.01)
(52) U.S. Cl. .................................. 416/244 A; 416/248
(58) Field of Classification Search ............ 416/244 A, 416/248, 204 A, 244 R, 188, 204 R
See application file for complete search history.

(56) References Cited

U.S. PATENT DOCUMENTS

| | | | |
|---|---|---|---|
| 3,961,867 A * | 6/1976 | Woollenweber | 416/244 A |
| 4,705,463 A | 11/1987 | Joco | |
| 4,850,802 A * | 7/1989 | Pankratz et al. | 416/241 R |
| 4,944,660 A | 7/1990 | Joco | |
| 4,986,733 A | 1/1991 | Fleury et al. | |
| 5,176,497 A | 1/1993 | Deacon et al. | |
| 6,164,931 A | 12/2000 | Norton et al. | |
| 2004/0057834 A1 * | 3/2004 | Shimizu | 416/244 A |

\* cited by examiner

*Primary Examiner*—Edward K. Look
*Assistant Examiner*—Richard A. Edgar
(74) *Attorney, Agent, or Firm*—Fletcher Yoder

(57) ABSTRACT

Compressor wheel and techniques for manufacturing such a wheel are provided. The wheel may include a hub with a counterbore internally treated to impart residual compressive stresses for enhanced endurance to stress-induced fatigue. The surface treatment allows extending the counterbore relatively closer to a plane of typical maximum stress of the wheel. This design flexibility advantageously allows avoiding or reducing overhang of the compressor wheel, thereby improving rotor dynamics and reducing the axial length of the hub, and the overall foot print of the compressor wheel.

11 Claims, 4 Drawing Sheets

TURBOCHARGER COMPRESSOR WHEEL HAVING A COUNTERBORE TREATED FOR ENHANCED ENDURANCE TO STRESS-INDUCED FATIGUE AND CONFIGURABLE TO PROVIDE A COMPACT AXIAL LENGTH

BACKGROUND OF THE INVENTION

This invention relates generally to compressor wheels or impellers as may be used in a turbocharger, supercharger, and the like.

Locomotives equipped with internal combustion engines, e.g., diesel engines, designed to meet stringent emissions regulations may require relatively high air flow rates and high manifold pressures, as may be provided by a turbocharger, to meet air quality targets while maximizing fuel economy and reliability. The high boost ratios, typically 3.8 or higher, may require high tip speeds on a turbocharger compressor wheel, which may lead to high levels of tensile stress in a bore area and shortened wheel life due to low cycle fatigue. It is known that compressor wheels have used a through bore that extends through the center of the wheel along a rotation axis, and where the wheel may be securely mounted onto a shaft with a locking nut.

It is further known that so called boreless compressor wheels are able to rotate at higher speeds than compressor wheels having a through bore since a through bore removes load carrying material and thereby increases the stress level in the remaining material. That is, more wheel material exists at a point of maximum centrifugal load that results in higher load carrying capability.

In one known compressor wheel, a hub section of the compressor wheel that axially corresponds with the radially outermost portion of the wheel experiences the maximum centrifugal load. That is, a plane indicative of typical maximum stress exists in substantial axial alignment with the maximum radial extent of the hub. In this known compressor wheel, a threaded counterbore is provided in a hub extension for receiving the shaft. However, the counterbore must terminate well short of the plane indicative of typical maximum stress to avoid the high level of stress at that location. Since the length of the shaft/threaded interface is generally constant for any given application, the foregoing arrangement (that causes the designer to position such an interface away from the high stress plane) may result in excessive overhang of the compressor wheel. This detrimentally affects rotor dynamics and increases the axial length of the hub extension, thus increasing the overall footprint of the compressor wheel and turbocharger.

BRIEF DESCRIPTION OF THE INVENTION

Aspects of the present invention propose to improve compressor life by using a hub with a counterbore including a base surface treated to impart residual compressive stresses for enhanced endurance to stress-induced fatigue. The surface treatment allows extending the counterbore relatively closer to a plane indicative of typical maximum stress. This design flexibility advantageously allows avoiding or reducing overhang of the compressor wheel, thereby improving rotor dynamics and reducing the axial length of the hub, and the overall foot print of the compressor wheel and turbocharger.

Generally, the present invention fulfills the foregoing needs by providing in one aspect thereof, a method of manufacturing a compressor wheel. The method allows providing a hub extension of the compressor wheel that defines a counterbore. The method further allows imparting residual compressive stresses to a base surface of the counterbore.

In another aspect thereof, the present invention further fulfills the foregoing needs by providing a compressor wheel comprising a hub including a hub extension that defines a counterbore. The counterbore includes a base surface and the base surface of the counterbore is treated to impart residual compressive stresses thereto.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
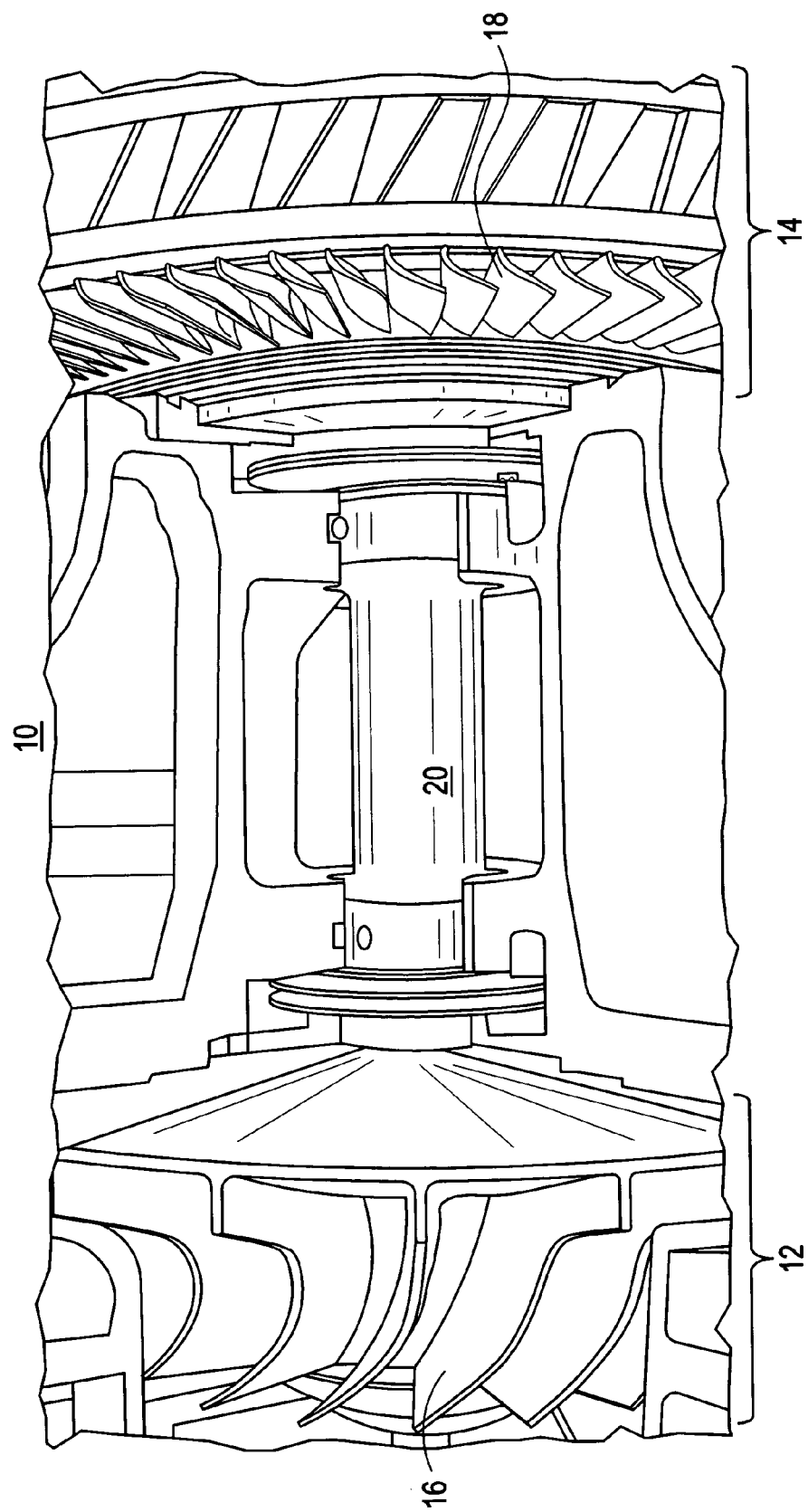
FIG. 1 illustrates a cutaway view of an exemplary turbocharger that may benefit from the teachings of the present invention.

FIG. 1 shows a cutaway view of an exemplary turbocharger 10 that may benefit from the teachings of the present invention. Turbocharger 10 generally comprises respective compressor and turbine stages 12 and 14 including a compressor wheel 16 and a turbine wheel 18 coupled through a rotatable shaft 20. The turbine wheel 18 is disposed within a turbine housing, which includes an inlet for receiving exhaust gases from an internal combustion engine (not shown). The turbine housing guides the engine exhaust gases for communication with and expansion through the turbine wheel 18 for rotatably driving the turbine wheel. Simultaneously, the turbine wheel rotatably drives the shaft 20 and compressor wheel 16, as may be disposed within a compressor housing. The compressor wheel 16 and housing allow drawing in and compressing ambient air for supply to the intake of the engine.

Figure 2:
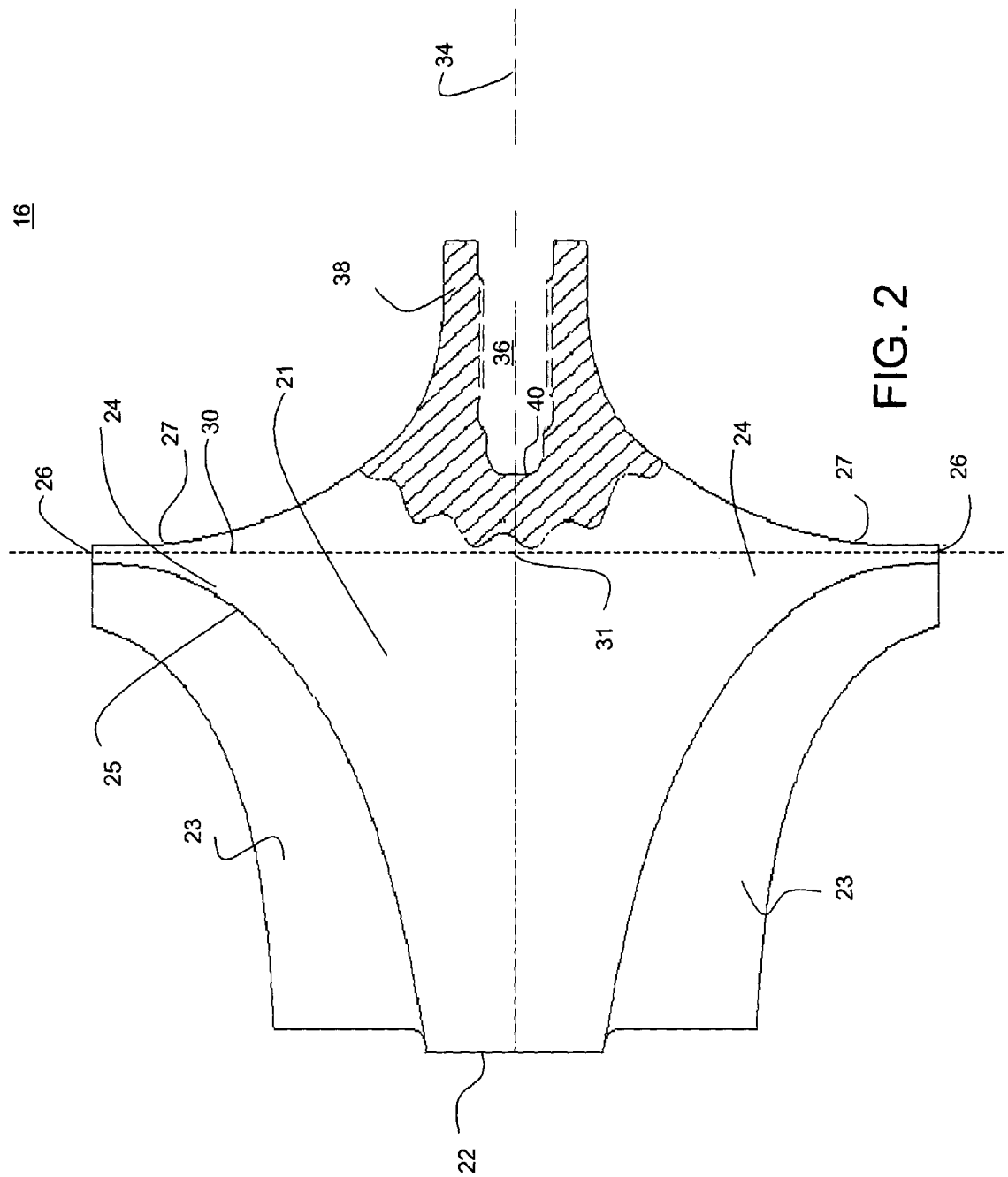
FIG. 2 shows a cross-sectional view of an exemplary compressor wheel embodying aspects of the present invention.

Referring to FIG. 2, a cross-sectional view of an exemplary embodiment of the compressor wheel 16 is shown. Compressor wheel 16 includes a hub portion 21. The hub portion 21 defines a front face surface 22 for the compressor wheel 16, and supports a plurality of circumferentially spaced apart compressor blades 23 (only two of which are visible in FIG. 2) extending both radially outwardly and axially thereon. The hub portion 21 also includes a radially enlarged disc-like portion 24 which serves to support the compressor blades 23 as well as to define a floor surface 25 for the air flow channels defined between blades 23. The disc-like portion 24 also defines a radially outer circumferential surface 26 for hub 21, as well as an axially disposed back side or back face surface 27.

As will be recognized by those skilled in the pertinent art, in operation of compressor wheel 16, a plane indicative of typical maximum stress 30 typically exists substantially in axial alignment with the maximum radial extent of the hub 21. That is, the plane of maximum stress 30 is typically coincident with surface 26 and reaches a maximum at the point where the rotation axis 34 transects plane 30, approximately at point 31.

To avoid the undesirable stress concentration of a conventional through bore and preserve the strength of solid metal adjacent to point 31, compressor wheel 16 includes a hub extension 38 integrally defined by hub 21 and extending axially away from plane 30. Hub extension 38 defines an axially extending counterbore 36.

The inventors of the present invention have innovatively recognized that one may advantageously improve rotor dynamics as well as reduce the axial length of the compressor wheel when a base surface 40 of counterbore 36 is treated to impart residual compressive stresses to such a base surface. Examples of techniques, such as cold working techniques, that may be used to treat the counterbore base surface may comprise shot peening, laser peening, glass beading, roll burnishing, etc. Cold working provides plastic deformation of a metal (e.g., aluminum) below its annealing temperature to cause permanent strain hardening.

Peening, as understood in the art and as used herein, means to compress a portion of a surface by forming a depression or indentation on the surface. Peening equipment generally is utilized to create a compressively stressed protection layer at the outer surface of a workpiece. The protection layer considerably increases the resistance of the workpiece to fatigue failure. A shot used in shot peening may comprise spherical particles constructed from a hard metal or any other suitable material. With shot peening systems, a stream of shot particles traveling at a high velocity is directed at an outer surface of a workpiece, e.g., the base of the counterbore. Each shot particle that impacts with sufficient force upon the outer surface of the workpiece causes plastic deformation of the surface and a dimple is formed therein. In this manner, a compressively stressed layer is formed at the outer surface of the workpiece to increase fatigue strength of the workpiece.

In laser peening, a laser beam from a laser beam source is used to produce a strong localized compressive force on a surface. Laser peening may be utilized in lieu of shot peening to create a compressively stressed protection layer at the outer surface of a workpiece. This type of treatment also considerably increases the resistance of the workpiece to fatigue failure. Thus, peening is typically a very effective means for producing surface compression residual stress, and therefore, prolonging the useful life of the workpiece.

Figure 3:
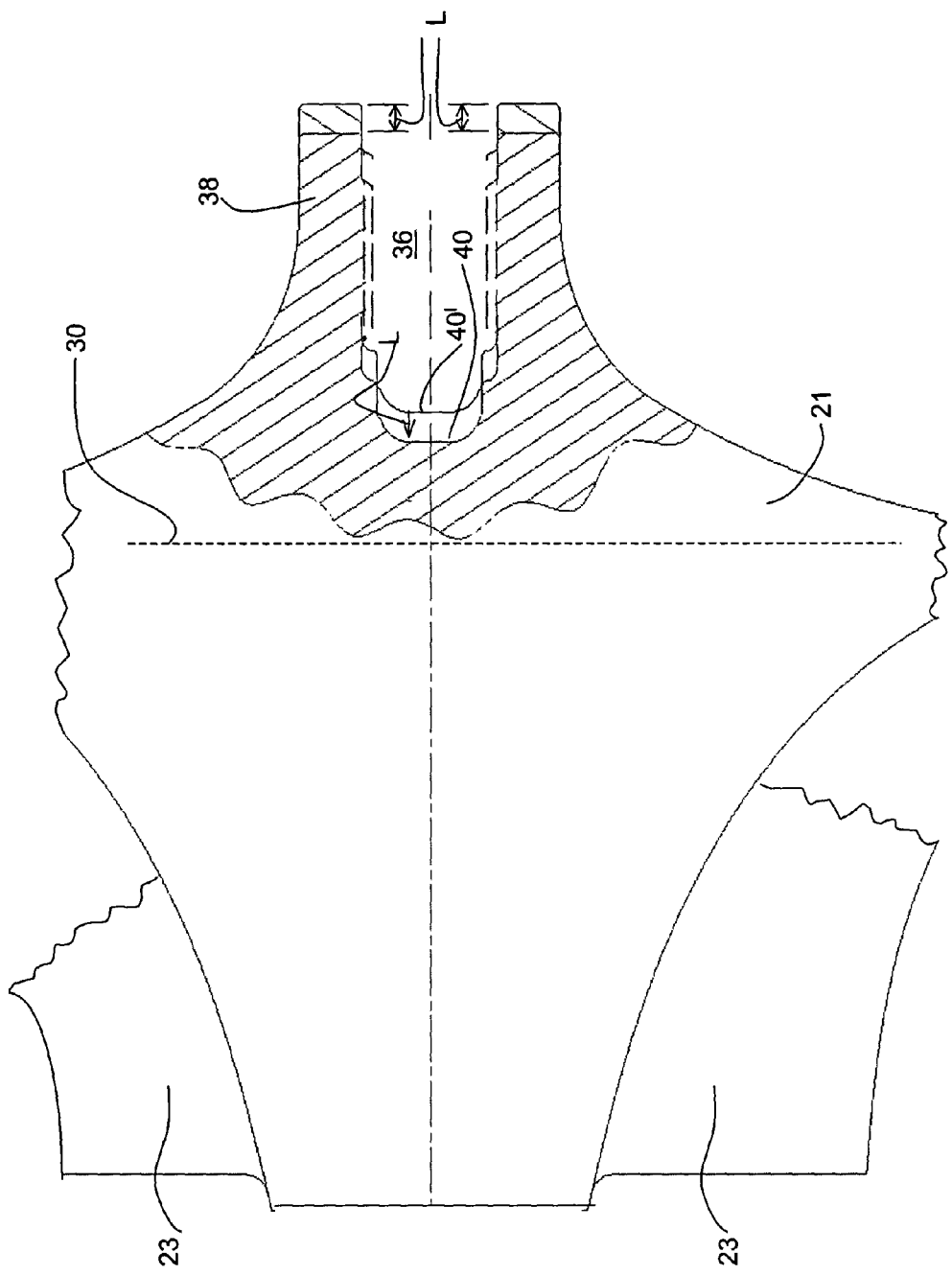
FIG. 3 shows configurational details regarding the compressor wheel of FIG. 2 that allow positioning a mounting counterbore relatively closer to a plane indicative of typical maximum stress of the wheel.

As shown in FIG. 3, the surface treatment of the base of the counterbore allows extending the base surface 40 of counterbore 36 relatively closer to the plane 30 indicative of typical maximum stress. This is exemplarily illustrated in FIG. 3 by the representation of the counterbore base 40' relative to the representation of the counterbore base 40. This design flexibility advantageously allows avoiding or reducing overhang of the compressor wheel, thereby improving rotor dynamics and reducing the axial length of the hub extension, and the overall foot print of the compressor wheel and turbocharger. For example, assuming the base 40 of counterbore 36 is configured to extend a distance L towards plane 30, this would allow reducing the axial length of the hub extension 38 by distance L.

Figure 4:
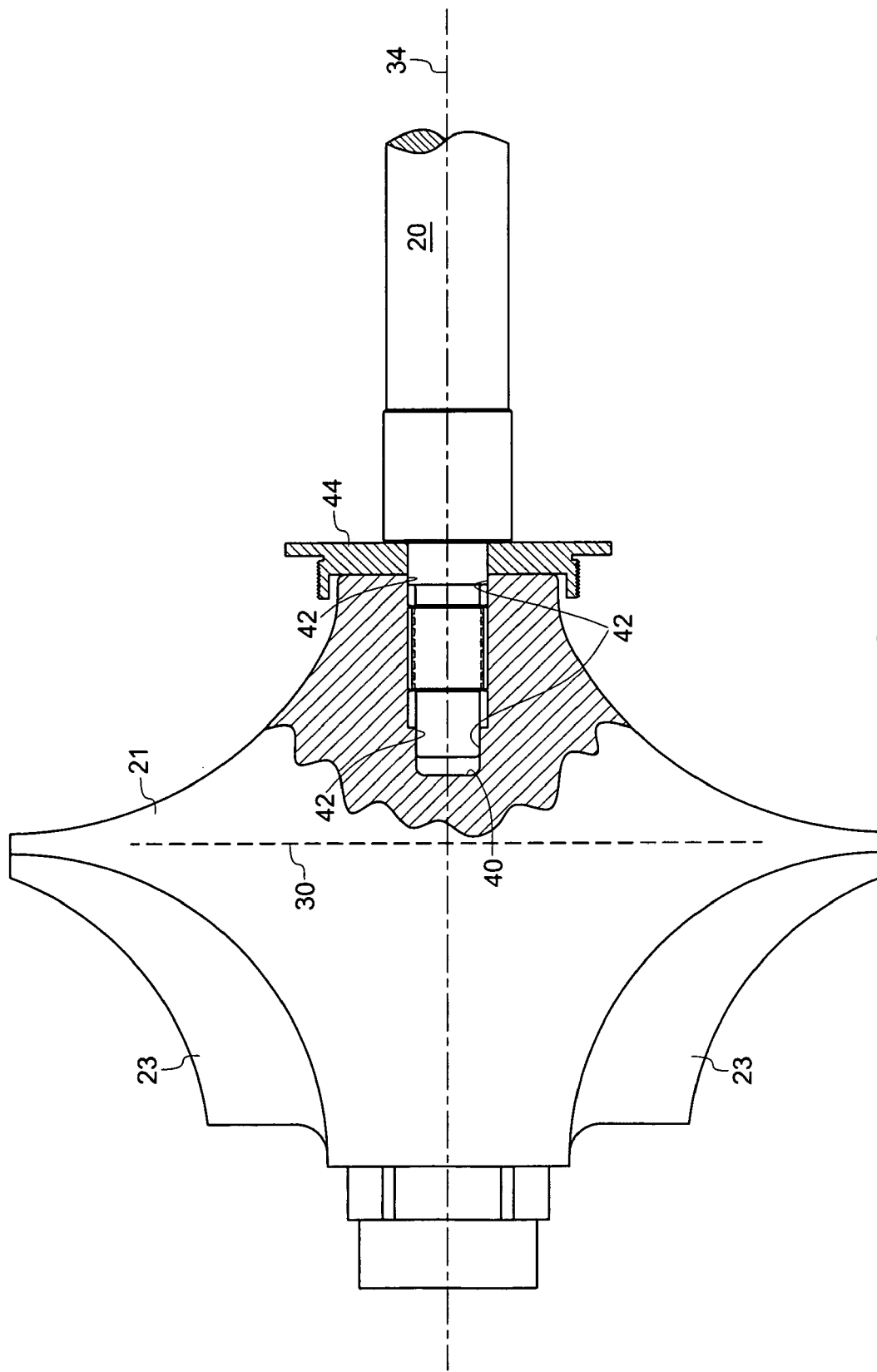
FIG. 4 shows a rotatable shaft assembled into a counterbore embodying aspects of the present invention.

In yet another aspect of the invention, as may be appreciated in FIG. 4, the extended base 40 of the counterbore allows deeper penetration of shaft 20 relative to the plane 30 of typical maximum tensile stress, thereby reducing axial overhang of the compressor wheel. In one exemplary embodiment, counterbore 36 includes alignment pilots 42 disposed to facilitate the centering of the shaft 20 received in counterbore 36. That is, alignment pilots 42 are configured to minimize eccentricity of shaft 20 relative to the walls of the counterbore. As will be appreciated by those skilled in the art, the compressor wheel, shaft, and thrust collar 44 may rotate relative to a bearing configured to provide radial support to the rotating structures.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of manufacturing a compressor wheel, the method comprising:
   providing a hub extension on a hub of the compressor wheel, the hub extension defining a counterbore not extending through a plane indicative of typical maximum tensile stress of the compressor wheel; and
   imparting residual compressive stresses to a base surface of the counterbore.

2. The method of claim 1 further comprising configuring the counterbore to extend its base surface towards the plane indicative of typical maximum tensile stress of the compressor wheel.

3. The method of claim 2 further comprising reducing the axial length of the hub extension based on the distance that the base surface of the counterbore is extended towards the plane indicative of typical maximum tensile stress of the compressor wheel.

4. The method of claim 1 wherein the imparting of residual compressive stresses to the base surface of the counterbore is selected from the group consisting of shot peening, laser peening, roll burnishing, and glass beading said surface.

5. A method for reducing the axial length of a compressor wheel, the method comprising:
   providing a hub extension on a hub of the compressor wheel, the hub extension defining a counterbore;
   imparting residual compressive stresses to a base surface of the counterbore;
   extending the base surface of said counterbore towards a plane indicative of typical maximum tensile stress of the compressor wheel; and
   reducing the axial length of the compressor wheel based on the distance that the base surface of the counterbore is extended towards the plane indicative of typical maximum tensile stress.

6. The method of claim 5 wherein the imparting of residual compressive stresses to the base surface of the counterbore is selected from the group consisting of shot peening, laser peening, roll burnishing, and glass beading said surface.

7. The method of claim 5 further comprising mounting a rotatable shaft into the counterbore, wherein the extended base surface of said counterbore allows deeper penetration of said shaft relative to the plane indicative of typical maximum tensile stress, thereby reducing axial overhang of the compressor wheel.

8. A compressor wheel comprising:
   a hub including a hub extension that defines a counterbore, said counterbore including a base surface not extending through a plane indicative of typical maximum tensile stress of the compressor wheel, wherein the base surface of said counterbore is treated to impart residual compressive stresses thereto.

9. The compressor wheel of claim 8 wherein the hub and hub extension comprise an integral structure.

10. The compressor wheel of claim 8 wherein the counterbore includes alignment pilots configured to center a shaft received in the counterbore.

11. A turbocharger for an internal combustion engine, said turbocharger comprising:

a compressor wheel;

a hub in said compressor wheel, the hub including a hub extension that defines a counterbore including a base surface not extending through a plane indicative of typical maximum tensile stress of the compressor wheel, wherein the base surface of said counterbore is treated to impart residual compressive stresses thereto, and further wherein the base surface of said counterbore is configured to extend towards but not through the plane indicative of typical maximum tensile stress of the compressor wheel; and a rotatable shaft mounted in the counterbore, wherein the extended base surface of said counterbore allows deeper penetration of said shaft relative to the plane indicative of typical maximum tensile stress, thereby reducing axial overhang of the compressor wheel.

\* \* \* \* \*